Jan. 24, 1956    R. S. NORDEEN    2,731,724
APPARATUS FOR EXTRACTING MERCURY FROM AMALGAM
Filed Sept. 15, 1954    3 Sheets-Sheet 1
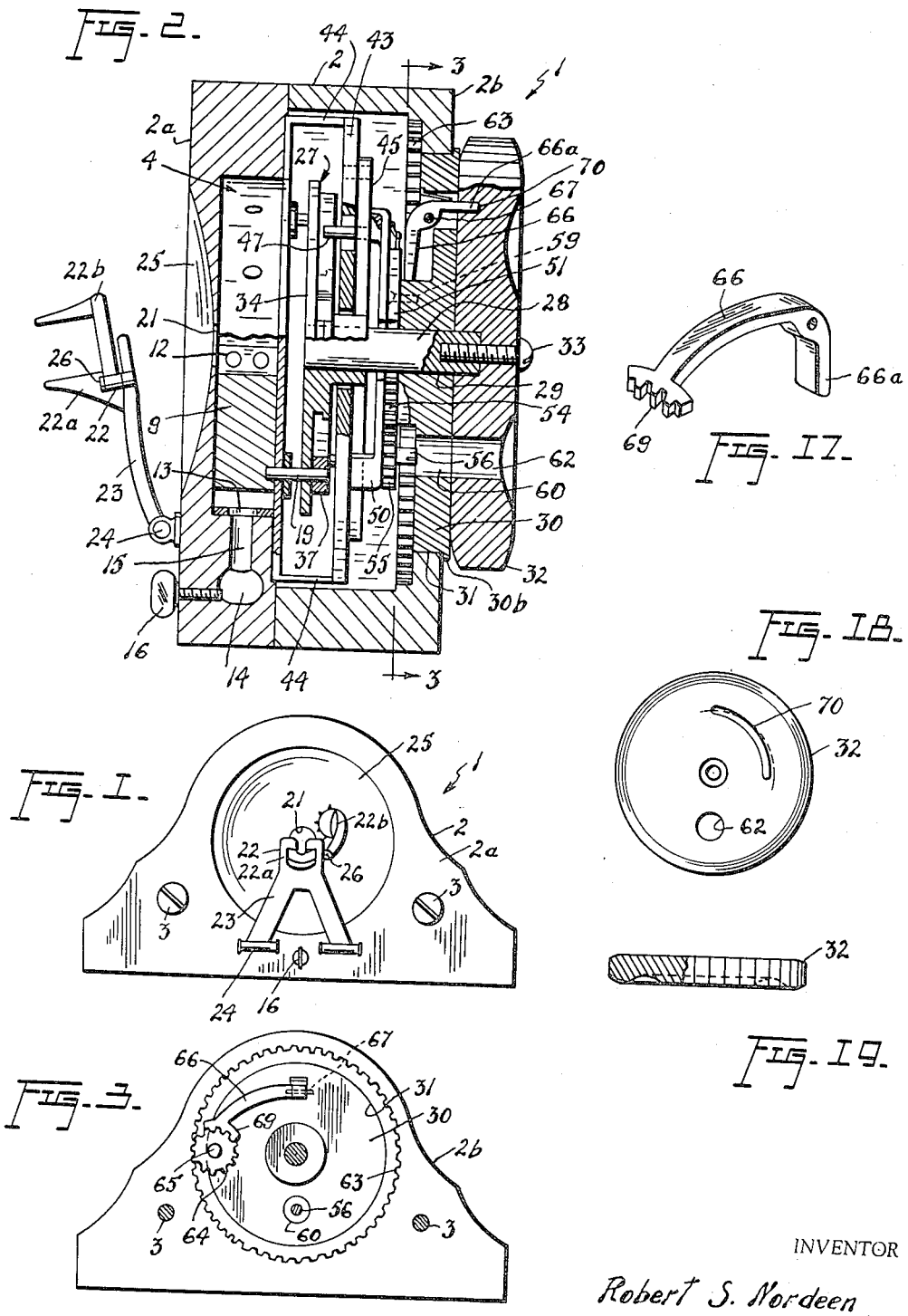
INVENTOR
Robert S. Nordeen
BY Munsm Hrave
ATTORNEY Jan. 24, 1956

R. S. NORDEEN 2,731,724

APPARATUS FOR EXTRACTING MERCURY FROM AMALGAM

Filed Sept. 15, 1954

INVENTOR
Robert S. Nordeen
BY
ATTORNEY

Jan. 24, 1956  R. S. NORDEEN  2,731,724
APPARATUS FOR EXTRACTING MERCURY FROM AMALGAM
Filed Sept. 15, 1954  3 Sheets-Sheet 3
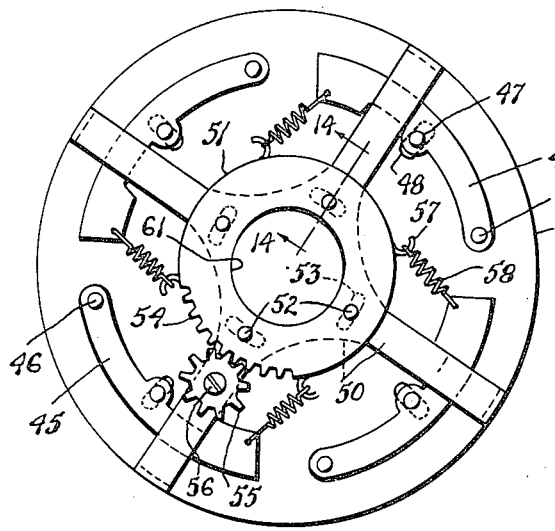
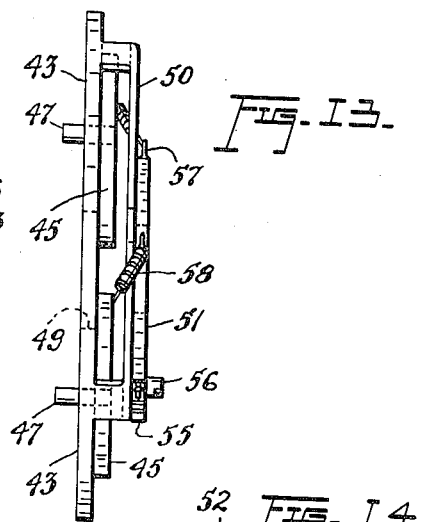
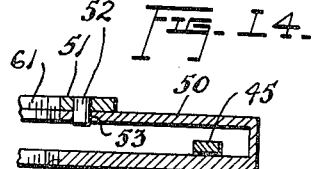
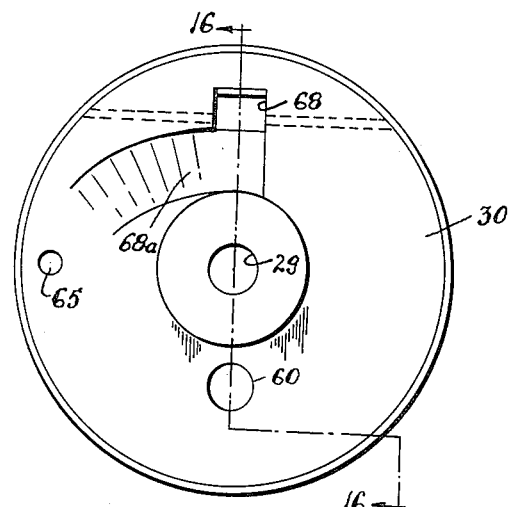
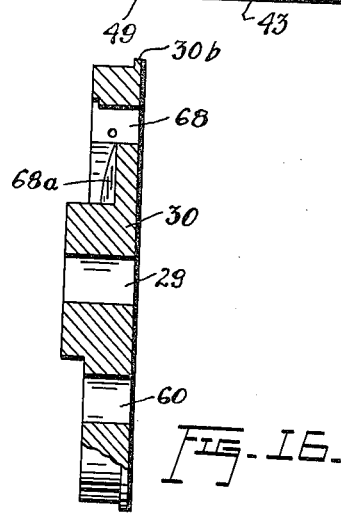
INVENTOR
Robert S. Nordeen
BY
ATTORNEY

United States Patent Office 2,731,724
Patented Jan. 24, 1956

2,731,724
APPARATUS FOR EXTRACTING MERCURY FROM AMALGAM

Robert S. Nordeen, Albuquerque, N. Mex.

Application September 15, 1954, Serial No. 456,289

13 Claims. (Cl. 32—40)

This invention relates to new and useful improvements in apparatus for extracting mercury from amalgam as utilized in the dental profession.

As is well known, the formation of a proper amalgam mixture requires every particle of silver powder to be completely coated with mercury, which can be assured only by using an excess of mercury to provide a wet fluid mass. However, the excess mercury must be subsequently removed as promptly and efficiently as possible, since the time required for hardening or setting of the amalgam depends upon the dryness of the mass.

In accordance with conventional practice the mixed mass is usually placed in a porous wrapper which is squeezed by the operator while mercury extruded through the pores of the wrapper is wiped off. This procedure not only results in loss and waste of the extracted mercury, but also is an unsatisfactory performance of the extracting operation itself which is limited by the physical strength of the operator in squeezing the wrapped amalgam.

The instant invention has for its principal object the elimination of the disadvantages above outlined, this being achieved by the provision of an apparatus whereby mercury in the wrapped amalgam may be extracted in an efficient manner by mechanical means rather than by finger pressure, and wherein provisions are made for gathering the extracted mercury so that it may be saved for subsequent use.

An important feature of the invention resides in arranging the apparatus in such manner that the wrapped amalgam is subjected to a compressing force as well as to a rotary or twisting action, whereby the extracting forces are equally distributed throughout the amalgam mass to assure proper and efficient expulsion of mercury therefrom.

Another important feature of the invention involves the provision of means for adjusting the compressing force exerted upon the wrapped amalgam as required by the size or volume of the mass.

Other features of the invention reside in its simple, efficient and highly expeditious operation, which enables the amalgam mass to be quickly and easily prepared in readiness for immediate use.

With the above more important objects and features in view and such other objects and features as may become apparent as this specification proceeds, the invention resides in the details of construction and arrangement of parts substantially as shown in the accompanying drawings wherein:

Figure 1 is a front elevational view of the invention;

Figure 2 is a vertical sectional view thereof, on an enlarged scale;

Figure 3 is a sectional view, taken substantially in the plane of the line 3—3 in Figure 2;

Figure 12 is an elevational view of another section of the pressure exerting unit;

Figure 13 is an edge view of the device shown in Figure 12;

Figure 14 is a sectional detail, taken substantially in the plane of the line 14—14 in Figure 12;

Figure 15 is an elevational view of a plug;

Figure 16 is a sectional view, taken substantially in the plane of the line 16—16 in Figure 15;

Figure 17 is a perspective view of a locking crank;

Figure 18 is an elevational view of an actuating knob; and

Figure 19 is an edge view of the actuating knob, partially shown in section.

Like characters of reference are employed to designate like parts in the specification and throughout the several views.

With reference now to the accompanying drawings in detail, the apparatus is designated generally by the numeral 1 and embodies in its construction a housing 2 which is preferably formed in two complemental parts 2a and 2b, separably secured together by suitable screws 3.

Figure 4:
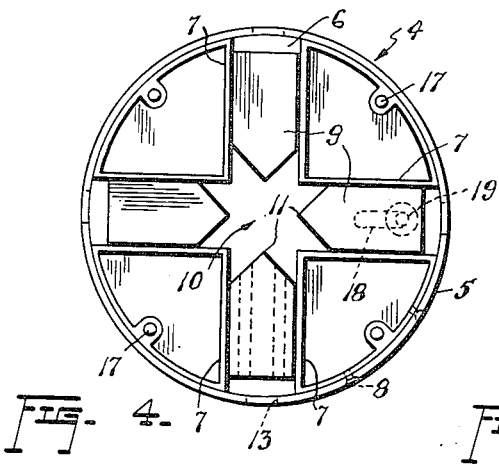
Figure 4 is an elevational view of the extracting member.
Figure 7:
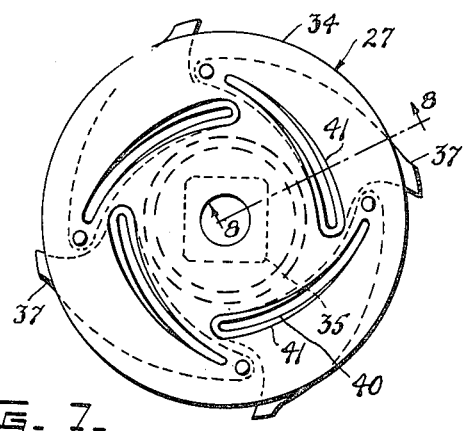
Figure 7 is an elevational view of one section of the pressure exerting unit taken from the front thereof.
Figure 5:
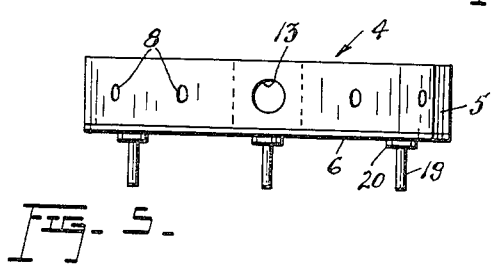
Figure 5 is an edge view of the extracting member.
Figure 9:
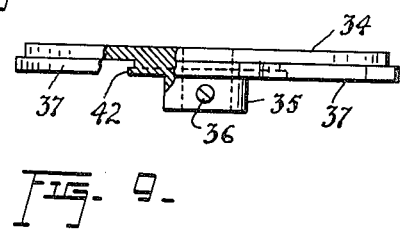
Figure 9 is an edge view, partially broken away, of the device shown in Figure 7.
Figure 6:
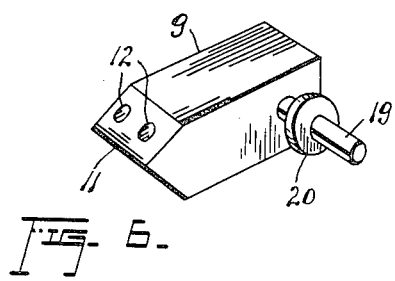
Figure 6 is a perspective view of one of the jaws.
Figure 10:
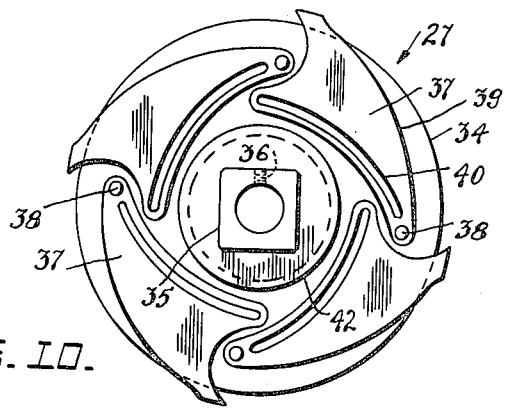
Figure 10 is a rear elevational view of the device shown in Figure 7.
Figure 11:
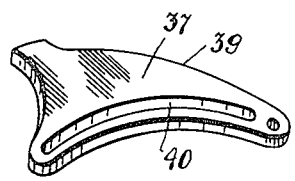
Figure 11 is a perspective view of one of the cams.
Figure 8:
Figure 8 is a sectional detail, taken substantially in the plane of the line 8—8 in Figure 7.

The front portion 2a of the housing accommodates a disc-shaped, rotatable extracting member 4 which, as is best seen in Figures 4 and 5, comprises an annular wall 5, a back wall 6 and a set of sector-shaped inserts 7 which are secured by suitable rivets 8 to the wall 5 and are spaced apart so as to afford therebetween a set of guideways for radially slidable work engaging jaws 9. The inserts 7 also define what may be called a work receiving chamber 10 at the center of the member 4 into which the jaws 9 may be slidably projected. The inner end portions of the jaws are complementally pointed as indicated at 11 so that they may be brought into an interfitting, contacting relation at the center of the chamber 10.

The jaws 9 are provided with longitudinally extending drain passages 12 and the wall 5 is provided with drain openings 13, whereby mercury extracted from amalgam in the chamber 10 as hereinafter described may collect in a receptacle 14 provided in the housing portion 2a under the extracting member 4. A passage 15, also provided in the housing portion 2a in communication with the receptacle 14, is registrable with the openings 13 and, consequently, with the passages 12 in the jaws 9. Mercury accumulated in the receptacle 14 may be drained by removing a suitable screw or plug 16, as will be clearly apparent.

The back wall 6 of the member 4 is attached by suitable screws 17 to the inserts 7 and the back wall is also provided with radial slots 18 to slidably accommodate pins 19 which are provided on the jaws 9 and project outwardly from the member 4. Suitable washers 20 are pressed on the pins 19 and, being disposed outside the back wall 6, serve to slidably retain the jaws 9 in the extracting member.

The amalgam from which mercury is to be extracted is placed in a wrapper of porous material which is inserted into the chamber 10 through an opening 21 formed in the housing portion 2a. Edge portions of such a wrapper are bundled together and placed in a clamp 22 carried by a bracket 23 which is hingedly attached to the front face of the housing as indicated at 24. The clamp 22 is thus swingable toward and away from the housing in a plane parallel to the axis of the extracting member 4 and the housing portion 2a may be provided with a concave recess 25 at the front thereof, so as to facilitate insertion of the wrapped amalgam through the opening 21 into the chamber 10. The clamp 22 may simply assume the form of a jaw member 22a integral with the bracket 23 and a coacting jaw member 22b pivoted to the member 22a by a pin 26. In any event, it will be apparent from the foregoing that when the wrapper containing amalgam is placed in the chamber 10 and the bundled outer portion of the wrapper is locked in the clamp 22, the outer portion of the wrapper will be securely held against movement while the inner, amalgam containing portion is subjected to action by the extracting member 4.

Means for actuating the member 4 comprise a pressure exerting unit 27 which is rotatably disposed in the housing portion 2b and includes a shaft 28 mounted coaxially with the member 4 in a bearing 29 afforded at the center of a circular plug 30. The latter, in turn, is rotatably disposed in a circular aperture or opening 31 provided at the back of the housing section 2b.

The shaft 28 projects outwardly from the housing 2 and an actuating knob 32 is secured by means of a screw 33 to the projecting portion of the shaft for rotation therewith. It is to be noted that the knob 32 is disposed immediately adjacent a flange 30b provided on the plug 30.

A circular plate 34, provided at the center thereof with a boss 35, is secured by a set screw 36 to the inner end portion of the shaft 28 and a plurality of radially swingable cams 37 are pivoted to the plate 34 by suitable pins 38. The cams 37 are provided with outer cam edges 39 and arcuate cam slots 40, the latter receiving therein the projecting portions of the aforementioned pins 19. The plate 34 itself is provided with elongated slots or openings 41 which have the pins 19 extending therethrough into the slots 40 of the cams, the openings 41 being in register with the slots 40 and being of such size as to permit a certain amount of radial movement of the cams and of the associated pins 19. When the cams 37 are shifted inwardly, they abut an annular shoulder 42 provided on the boss 35 of the plate 34.

The pressure exerting unit 27 also includes a disc 43 which is in a spaced coaxial relation with the extracting member 4 and is secured to the back wall 6 of the latter by a plurality of cross arms 44, the space between the member 4 and the disc 43 being such as to accommodate the plate 34 and the cams 37 therebetween, as is clearly shown in Figure 2.

A plurality of radially swingable levers 45 are pivoted to the disc 43 by suitable pins 46 and an intermediate portion of each lever is provided with an actuating pin 47. The pins 47 project through radial slots 48 formed in the disc 43 and engage the aforementioned cam edges 39 of the respective cams 37.

The center portion of the disc 43 is provided with an opening 49 which has the boss 35 of the plate 34 rotatable therein.

A spider 50 is secured in spaced coaxial relation to the disc 43 and a ring 51 is rotatably mounted on this spider by means of pins 52 disposed in arcuate slots 53 with which the spider is provided. In this manner a certain amount of rotary movement of the ring relative to the spider is facilitated. In order to effect that movement, a portion of the periphery of the ring 51 is notched to provide a toothed segment 54 which meshes with a pinion 55 secured to a stub shaft 56 rotatably mounted on one of the arms of the spider 50. The periphery of the ring 51 is also provided with a plurality of hooks 57 for the anchorage of tension springs 58 which are connected to the free end portions of the levers 45 and thereby urge the levers radially inwardly, so that the pins 47 exert an inward radial pressure on the cam edges 39. It will be apparent that by simply rotating the stub shaft 56 with the pinion 55 so that the ring 51 is rotated relative to the spider 50, the tension of the springs 58 may be increased or decreased, as desired, thus correspondingly varying the pressure which the pins 47 exert upon the cams 37.

The aforementioned plug 32 is rotatable with the extracting member 4 and with the associated disc 43 by being secured to the spider 50, such as for example, by suitable screws, one of which is shown at 59 in Figure 2.

The plug is provided with an opening 60 through which access may be had to the stub shaft 56, the latter preferably being kerfed as shown to facilitate turning. It will be also noted that the disc 43 is rotatable as a unit with the spider 50 and the ring 51, unless the relationship between the spider and the ring is varied by the adjusting means 54, 55. The spider as well as the ring are provided at the center thereof with registering apertures 61 to rotatably receive the shaft 28 therein.

The actuating knob 32 is also provided with an opening 62 which is registrable with the opening 60 in the plug 30 for gaining access to the stub shaft 56. As will be hereinafter explained, the knob 32 may be rotated while the plug 30 remains stationary. Nevertheless, at the commencement of operations the openings 60, 62 are in register so that an adjustment of the stub shaft 56 may be made, if desired.

Means are provided for locking the extracting member 4, the disc 43, the spider 50 and the ring 51 against rotation, these means comprising an internal ring gear 63 formed integrally in the interior of the housing portion 2b adjacent the plug 30. A pinion 64 is rotatably mounted on a pin 65 carried by the plug 30 and meshes with the ring gear 63 as shown in Figure 3. Thus, when the pinion 64 is locked against rotation, corresponding locking of the plug 30, ring 51, disc 50 and member 4 occurs. The locking of the pinion 64 is effected by a bell crank 66 which is pivotally mounted by a transverse pin 67 in a recess 68 formed in the plug 30, one end portion of the crank 66 being provided with a toothed locking segment 69 which is engageable with the pinion. The other end portion 66a of the crank 66 projects outwardly from the recess 68 into a cam track 70 formed in the knob 32. As is best shown in Figure 18, one end of this cam track is more remote from the center of the knob than the other end and when the crank portion 66a is disposed in the more remote end of the cam track, the segment 69 engages the pinion 64 and locks the same against rotation. However, when the knob 32 is turned through approximately ninety degrees, the cam track 70 shifts the crank 66 so that the segment 69 is disengaged from the pinion and rotation of the latter as well as the associated parts 30, 51, 50 and 4 is possible.

As is best shown in Figure 15, the plug 30, in addition to being provided with the recess 68, is also formed with a recessed portion 68a to afford clearance for the movement of the crank 66.

A suitable leaf spring 71 is anchored in the recess 68 of the plug 30 and bears against the portion 66a of the crank 66, whereby to urge the segment 69 in locking engagement with the pinion 64.

Having thus described the construction of the invention, its manner of operation will now be explained.

The amalgam mass from which mercury is to be extracted is first placed in a porous wrapper which is inserted through the opening 21 into the chamber 10 of the extracting member 4. Free edge portions of the wrapper are permitted to project outwardly through the opening 21 and are bundled together and secured against movement in the clamp 22 at the outside of the housing 2.

With the openings 60, 62 in register, the stub shaft 56 may be adjusted for the desired tension of the springs 58 in accordance with the size or volume of amalgam in the wrapper.

Rotation may then be imparted to the actuating knob 32, during which action the crank 66 will lock the plug 30, the ring 51, the spider 50, the disc 43 and the extracting member 4 against rotary movement. However, rotation of the knob 32 will be transmitted by the shaft 28 to the plate 34 together with the associated cams 37 and with the pins 19 of the extracting member 4 held against rotation but engaging the slots 40 of the cams 37, the turning movement of the cams will cause the pins 19 to shift radially inwardly, thus sliding the jaws 9 into the chamber 10 and compressing the amalgam therein. As this action occurs, mercury extruded through the porous wrapper of the amalgam will escape through the passages 12, 13 and 15 into the receptacle 14 from which it may be subsequently drained for repeated use.

When the knob 32 has been rotated through approximately ninety degrees, the crank 66 will be released from locking engagement with the pinion 64 and as rotation of the knob is continued, the plug 30, the ring 51, the spider 50, the disc 43 and the member 4 will turn in unison with the knob 32. However, with the bundled outer portion of the amalgam wrapper held stationary in the clamp 22, the wrapped amalgam in the chamber 10 will be subjected to a rotary or twisting movement by the member 4, thereby coacting with the compressing force of the jaws 9 in extracting all surplus mercury from the amalgam.

After the extracting operation is completed, the apparatus may be returned to its initial position by simply rotating the knob 32 in a reverse direction.

If desired, power means such as an electric motor, or the like, may be employed for turning the knob 32.

Although in the foregoing there has been shown and described the preferred embodiment of the invention, various modifications may become apparent to those skilled in the art to which the invention relates. Accordingly, it is not desired to limit the invention to this disclosure and various modifications may be resorted to, such as may lie within the spirit and scope of the appended claims.

What is claimed as new is:

1. In an apparatus for extracting mercury from amalgam contained in a porous wrapper, the combination of a housing, an extracting member rotatably mounted in said housing and provided at the center thereof with a chamber to receive a wrapper containing amalgam, a plurality of work engaging jaws slidable radially in said member in and out of said chamber, means provided at the outside of said housing for sustaining a portion of the stated wrapper against movement, means for simultaneously sliding said jaws, and means for rotating said member when said jaws are slid into said chamber.

2. The structure as set forth in claim 1 wherein said housing is provided with a mercury receptacle under said extracting member.

3. In an apparatus for extracting mercury from amalgam contained in a porous wrapper, the combination of a housing provided at one side thereof with an opening, an extracting member rotatable in said housing and provided at the center thereof with a chamber to receive a wrapper containing amalgam, said opening communicating with said chamber whereby a portion of the stated wrapper may project outwardly from said housing, a plurality of work engaging jaws slidable radially in said member in and out of said chamber, means provided at the outside of said housing adjacent said opening for sustaining a projecting portion of the stated wrapper against movement, and common means for sliding said jaws into said chamber and subsequently imparting rotation to said member.

4. The structure as set forth in claim 3 wherein said means for sustaining the stated wrapper against movement comprise a clamp pivotally connected to said housing and swingable toward and away from said opening in a plane parallel to the axis of rotation of said member.

5. The structure as set forth in claim 3 wherein said housing is provided with a mercury receptacle under said extracting member, said jaws and said member being provided with drain passages registrable with said receptacle.

6. In an apparatus for extracting mercury from amalgam contained in a porous wrapper, the combination of a housing, an extracting member rotatable in said housing and provided at the center thereof with a chamber to receive a wrapper containing amalgam, a plurality of work engaging jaws slidable radially in said member in and out of said chamber, means provided at the outside of said housing for sustaining a portion of the stated wrapper against movement, a pressure exerting unit rotatably mounted in said housing adjacent and coaxially with said extracting member, said unit including a plurality of radially swingable cams operatively connected to the respective jaws, relatively stationary actuating elements engaging said cams, means for rotating said pressure exerting unit whereby said cams and said jaws may be moved radially inwardly by said elements, and means coacting with said last mentioned means for rotating said extracting member when said jaws are slid into said chamber.

7. The structure as set forth in claim 6 together with means for resiliently tensioning said actuating elements in engagement with said cams.

8. The structure as set forth in claim 6 together with means for resiliently tensioning said actuating elements in engagement with said cams, and means for adjusting the tension of the resilient tensioning means.

9. In an apparatus for extracting mercury from amalgam contained in a porous wrapper, the combination of a housing, an extracting member rotatable in said housing and provided at the center thereof with a chamber to receive a wrapper containing amalgam, a plurality of work engaging jaws slidable radially in said member in and out of said chamber, means provided on said housing for sustaining a portion of the stated wrapper against movement, a shaft rotatable in said housing coaxially with said extracting member, an actuating knob provided on said shaft at the outside of the housing, a pressure exerting unit disposed in the housing adjacent said extracting member and including a plate secured to said shaft, a plurality of radially swingable cams pivoted to said plate and operatively connected to the respective jaws, a relatively stationary disc having said shaft extending rotatably therethrough and secured to said extracting member, radially swingable levers pivoted to said disc, actuating pins carried by said levers and engaging said cams whereby the cams and said jaws may be moved radially inwardly when said plate is rotated relative to said disc, means for resiliently tensioning said pins in engagement with said cams, and means responsive to actuation of said knob for rotating said extracting member when said jaws are slid into said chamber.

10. The structure as set forth in claim 9 wherein said means for resiliently tensioning said pins comprise a ring coaxial with and connected to said disc, and springs anchored to said ring and connected to said levers.

11. The structure as set forth in claim 9 wherein said means for resiliently tensioning said pins comprise a ring coaxial with and rotatably attached to said disc, springs anchored to said ring and connected to said levers, and means for rotating said ring relative to the disc whereby the tension of said springs may be adjusted.

12. The structure as set forth in claim 9 together with means for locking said extracting member against rotation during initial inward movement of said jaws.

13. The structure as defined in claim 9 together with means for locking said extracting member against rotation during initial inward movement of said jaws, said last mentioned means comprising a plug rotatable in said housing and having said shaft extending rotatably therethrough, a stationary ring gear provided in said housing, a pinion rotatably mounted on said plug and meshing with said ring gear, a crank pivoted to said plug, a locking member provided on said crank and engaging said pinion, said actuating knob being provided with a cam track, and said crank engaging said track whereby said locking member may be disengaged from said pinion.

References Cited in the file of this patent

UNITED STATES PATENTS

| | | |
|---|---|---|
| 1,726,544 | De Simone | Sept. 3, 1929 |
| 2,618,854 | Lyon | Nov. 25, 1952 |